(12) United States Patent
Bingeman et al.

(10) Patent No.: US 9,914,899 B2
(45) Date of Patent: Mar. 13, 2018

(54) CHEMICAL ADDITIVES AND USE THEREOF IN CORN STILLAGE PROCESSING

(71) Applicant: Ethox Chemicals, LLC, Greenville, SC (US)

(72) Inventors: Ronald E. Bingeman, Greenville, SC (US); Charles F. Palmer, Jr., Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 0 days.

(21) Appl. No.: 15/159,520

(22) Filed: May 19, 2016

(65) Prior Publication Data

US 2016/0340609 A1    Nov. 24, 2016

Related U.S. Application Data

(60) Provisional application No. 62/164,363, filed on May 20, 2015.

(51) Int. Cl.
*C11B 1/00* (2006.01)
*C11B 13/00* (2006.01)
*C12F 3/10* (2006.01)

(52) U.S. Cl.
CPC .............. *C11B 13/00* (2013.01); *C12F 3/10* (2013.01); *Y02W 30/74* (2015.05)

(58) Field of Classification Search
CPC ..................................................... C11B 13/00
USPC ................................................................ 554/9
See application file for complete search history.

*Primary Examiner* — Deborah D Carr
(74) *Attorney, Agent, or Firm* — Joseph T. Guy; Patent Filing Specialist, Inc.

(57) ABSTRACT

An improved process is provided for separating corn oil from stillage comprising forming stillage from the fermentation of corn; mixing the stillage with a chemical additive comprising alkoxylated modified corn oil prepared by the transesterification of corn oil with glycerine followed by alkoxylation; and separating the corn oil from the stillage.

37 Claims, 1 Drawing Sheet

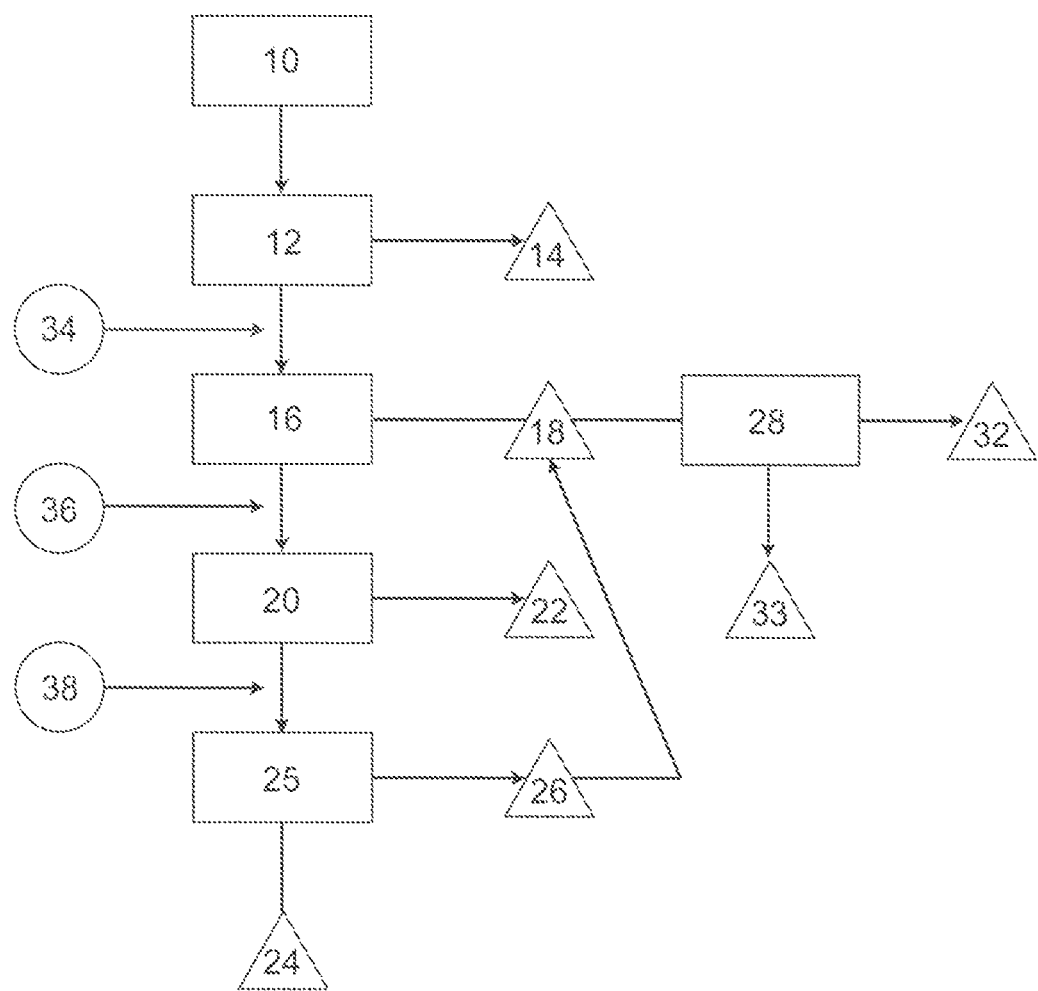

CHEMICAL ADDITIVES AND USE THEREOF IN CORN STILLAGE PROCESSING

CROSS-REFERENCE TO RELATED APPLICATIONS

The present invention claims priority to pending U.S. Provisional Patent Application No. 62/164,363 filed May 20, 2015.

BACKGROUND

The present invention is specific to an improved method of treating corn stillage. More specifically, the present invention is specific to improvements in the yield of corn oil from ethanol production facilities. Even more specifically, the present invention is related to modifications of corn oil to increase the extraction of value added components of corn stillage.

The production of ethanol from corn has increased significantly due, at least in part, to the use of ethanol as a motor fuel. This increase has led to ever increasing efforts to improve yields and, particularly, to improve the extraction of marketable products from the process. In general, there are several commercial products achieved from ethanol production with ethanol being a primary product. The secondary products of value are corn oil and dry distiller grain (DDG). Corn oil has many commercial applications, such as an additive in food stuffs, and DDG is a valuable feed for livestock. The relative value of corn oil exceeds the relative value of DDG and therefore it is advantageous to increase the corn oil yield which is otherwise incorporated in the DDG without appreciative value being added to the DDG.

The overall process is well known to include the mixture of corn with water to form mash. Enzymes are then added to convert the corn starch to sugar after which the sugar is converted to ethanol by fermentation thereby forming an intermediate referred to in the art as "beer". The ethanol is extracted from the beer by distillation with the remaining portion being referred to as stillage. The stillage contains water, protein, nutrients, fiber, and corn oil. It is preferable to remove the corn oil from the stillage with the fraction remaining being dried and provided commercially as DDG.

Separation of the corn oil and DDG typically involves an initial step of centrifugation wherein the solids fraction is referred to as wet grain and the liquid, which contains the corn oil, is referred to as thin stillage. The water of the thin stillage is reduced, preferably by evaporation with the water preferably being recycled into the process, resulting in syrup which has a higher concentration of corn oil than the thin stillage. The syrup and corn oil are then separated, again preferably by centrifugation, with the corn oil being isolated and the remainder, or oil depleted syrup, preferably being reincorporated with the wet grain. The wet grain is then typically dried for use as, primarily, dry feed. There has been significant effort in the art focused on increasing the amount of corn oil extracted from the stillage. The theoretical yield of corn oil per bushel of processed corn is about 725.7 grams (1.6 pounds) yet this theoretical limit is not met leading to the desire for processes and methods to increase the yield of corn oil.

U.S. Pat. No. 8,841,469, which is incorporated herein by reference, utilizes functionalized polyols derived from sorbitol, a sorbitan or isosorbide as a chemical additive to the process steam. Though beneficial, the yield is still well below the theoretical yield thereby leading to the desire for further improvements.

The present invention provides a significant improvement in the extraction of corn oil from corn stillage by chemical modification of corn oil and further formation of a derivative of the modified corn oil. The result is an increase in yield of corn oil without compromising the value of DDG. It would be understood to those of skill in the art that methods for increasing corn oil yield which render the DDG unsuitable for use as feed for livestock would be financially unsuitable solutions.

SUMMARY

It is an object of the invention to provide an improved method for extraction of corn oil from corn stillage.

A particular feature of the invention is the ability to increase the yield of corn oil, relative to the starting weight of corn, without detriment to the co-byproduct of DDG.

These and other advantages, as will be realized, are provided in a process for separating corn oil from stillage comprising forming stillage from fermentation of corn; mixing the stillage with a chemical additive comprising alkoxylated modified corn oil prepared by the transesterification of corn oil with glycerine followed by alkoxylation; and separating the corn oil from the stillage.

A mixture suitable for the extraction of corn oil comprising corn stillage and a chemical additive comprising alkoxylated modified corn oil prepared by the transesterification of corn oil with glycerine followed by alkoxylation.

BRIEF DESCRIPTION OF DRAWING

The FIGURE illustrates an embodiment of the invention in flow chart representation.

DESCRIPTION

The present invention is directed to improvements in the extraction of corn oil from corn stillage. More specifically, the present invention is related to an improved method for treating corn stillage, or components of corn stillage, to increase the yield of corn oil relative to the amount of corn processed.

The present invention discloses a method comprising the step of adding a chemical additive to improve the separation of corn oil from the process streams whether from whole stillage, thin stillage, syrup or any combination thereof. The method can be used in either a wet milling process or a dry milling process. Preferably, the method is employed in a dry-milling process.

For the purposes of discussion, stillage as used herein is all fractions of fermented corn remaining after removal of ethanol. When necessary for further clarification, stillage immediately after ethanol evaporation but prior to further processing may be referred to as whole stillage, whole stillage which has been separated into a solids fraction and a liquid fraction will be referred to separately as wet grain and thin stillage as appropriate, thin stillage which has been subjected to a water removal process is referred to as syrup; syrup is then separated into corn oil as a secondary product and oil depleted syrup which is preferably fed back into the wet grain; wet grain which is dried is referred to as DDG; as necessary water removed during any step is referred to as water or condensate as appropriate.

An embodiment of the invention will be described relative to the FIGURE wherein the process is illustrated by flow chart representation. In the FIGURE, the fermentation process occurs in a fermenter 10 wherein beer is formed comprising ethanol, corn oil, water, and various other products including those collectively referred to herein as wet grain. The beer is distilled at a distiller 12 resulting in ethanol, 14, as the primary product, and stillage which continues in the process. Stillage is preferably treated in a centrifuge at 16 yielding wet grain, 18, which is a secondary product precursor and thin stillage which continues in the process. Thin stillage is treated in an evaporator 20 to remove the water, such as by evaporation, resulting in condensate, 22, which may be reintroduced into the process prior to fermentation and syrup which continues in the process. Syrup is separated preferably in a centrifuge into corn oil, 24, a secondary product and oil depleted syrup, 26, and the oil depleted syrup is preferably incorporated with the wet grain. The wet grain is dried preferably in a drier 28 resulting in DDG, 33, a secondary product, and condensate, 32, which may be reintroduced into the process prior to fermentation. Chemical additive of the present invention may be added immediately after distillation at 34 wherein the chemical additive is added prior to separation of the wet grain from syrup. Chemical additive of the present invention may be added to the thin stillage at 36. Chemical additive of the present invention may be added to the syrup at 38.

The chemical additive is preferably added with adequate mixing and therefore the chemical additive can be added to the bulk of the solution or, more preferably, at an exit or entry of one of the processes containers such as at entry or exit points of the centrifuges evaporators or related equipment.

Another aspect of the invention is the application of the chemical additive to the whole stillage stream prior to separation of the wet cake from the thin stillage. A point of good mixing such as the inlet to a pump is preferred. Preferably the chemical additive is a material that is recognized as safe such that it does not comprise the potential end use of the resulting dry distiller grain (DDG) as a feedstock.

Some embodiments of the invention provide a benefit of producing a cleaner, high quality, oil by minimizing the suspended solids and/or water content of the resultant oil.

The chemical additive is a surfactant prepared by a two-step process. In step one, the triglyceride of corn oil, generally represented by Formula A, is derivatized:

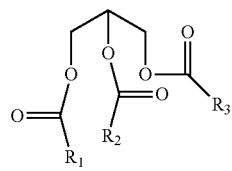

Formula A wherein $R_1$, $R_2$ and $R_3$ are independently the groups necessary to define corn oil and are predominantly seventeen or eighteen carbon unsaturated alkyl chains. More specifically, $R_1$, $R_2$ and $R_3$ independently comprise —$C_{18}H_{35}$, —$C_{18}H_{31}$, or $C_{16}H_{33}$.

The derivatization of the triglyceride of corn oil is formed by heating the corn oil with glycerin at a temperature sufficient to result in transesterification to produce a mixture of mono- and diglyceride esters as represented by the following diglycerides:

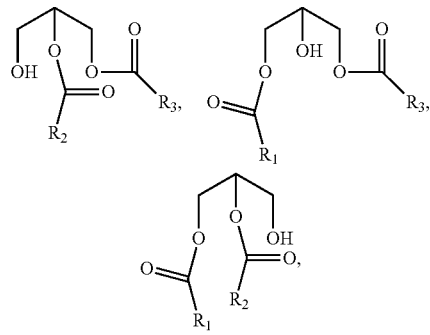

and the following monoglycerides:

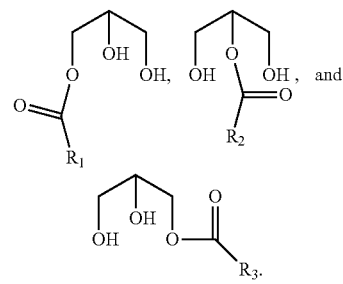

Transesterification continues until the total moles of monoglycerides and diglycerides are in a monoglyceride to diglyceride molar ratio of at least 0.1:1 to no more than 1:0.1 as determined by high performance liquid chromatography (HPLC), more preferably the ratio of monoglycerides and diglycerides is at least 0.5:1 to no more than 1:0.5 and preferably at least 1.1:1 to no more than 1:1.1. The molar ratio of mono glycerides to diglycerides is preferably about 1:1.

Transesterification can be done by treatment at elevated temperatures with or without a catalyst even though a base catalyst is preferred. Transesterification is a well-known process in the art and is widely used in the production of hydrocarbon products from fossil fuel. For demonstration of the invention, corn oil and glycerin are heated at about 170-180° C. preferably in the presence of a base catalyst, such as KOH, at atmospheric pressure for a time necessary to achieve the desired molar ratio of mono:di glycerides. About 8 hours is sufficient to achieve about a 1:1 ratio with other ratios being achieved at shorter times. It is preferable to follow the reaction with HPLC until the desired ratio of monoglycerides and diglycerides is achieved or to allow sufficient reaction time for all glycerine to react which will necessarily provide a 1:1 ratio of monoglycerides to diglycerides.

After transesterification, the mixture of corn oil mono- and diglycerides is then alkoxylated with alkyl oxides wherein each hydrogen atom of each hydroxyl group of the mono- and di-glycerides is preferably replaced by an alkoxy thereby forming alkoxylated modified corn oil selected from the group consisting of:

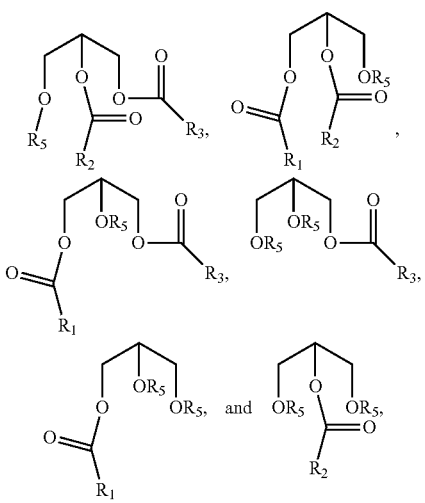

wherein each $R_5$ independently represents —(OCH$_2$CH($R^4$))$_a$—OR$^6$;
$R^4$ is selected from H, —CH$_3$ and —CH$_2$CH$_3$;
$R^6$ is selected from H, alkyl or substituted alkyl of 1 to 10 carbons, and —C(=O)OR$^7$;
$R^7$ is an alkyl or substituted alkyl of 1 to 10 carbons;
a=2-500, preferably 10-60, and most preferably 20-50.

The preferred alkoxy groups are ethylene oxides or mixtures of ethylene oxides with propylene oxides. A final weight percent of alkoxy oxides is preferably 60-100% ethylene oxide with the balance preferably propylene oxide. About 75% ethylene oxide is most preferred in some embodiments. It is preferable that the ratio of ethylene oxide to propylene oxide and the number of alkyl oxide chains in each be defined by melting characteristics. If the propylene oxide ratio is too high the cloud point is lower than desired. It is preferable that the alkoxylated mono and di-glycerides have a cloud point of about 60-100° C., preferably 75-90° C. and more preferably 85-90° C.

This alkoxylated mono- and di-glyceride may be further blended with a 0-50 wt %, liquid fatty acid ester of polyethylene glycol, and more preferably from 5-15 wt %, to produce a liquid product with a hydrophile/lipophile balance (HLB) of about 12 to 17 and more preferably about 15 wherein hydrophile/lipophile balance is defined in accordance with Griffin's method as set forth in *Journal of the Society of Cosmetic Chemists* 5 (4): 249-56. If the alkoxylate is liquid at ambient, blending with the polyethylene glycol (PEG) ester is not needed. Alkoxylates with sufficient propylene oxide copolymerized with the ethylene oxide to produce a liquid at ambient, for example, can be used without blending. In an exemplary embodiment, a 85:15 ethylene oxide to propylene oxide (EO:PO) mole ratio on the corn oil mono- and diglyceride mix with a 1:1 ratio of mono-diglyceride was liquid and gave equal or better performance in corn oil recovery than the 100% EO material blended with PEG 600 oleate (H(OCH$_2$CH$_2$)$_{14}$OC(=O)C$_{17}$H$_{33}$).

The amount of alkoxylated modified corn oil added to the stillage is preferably about 10-10,000 ppm by weight, more preferably about 200-800 ppm by weight and most preferably about 300-600 ppm by weight. Below about 10 ppm the effect is minimal and above about 10,000 ppm the additional additive provides no benefit.

The alkoxylate modified corn oil may be further blended with a silica and/or a defoamer.

EXAMPLES

Procedure

The procedure for determining the amount of residual corn oil that is extractible from a sample of stillage involves heating various stillage/additive mixtures, centrifuging them and comparing the amounts of free corn oil that separates from the various mixtures. The bulk stock of stillage that is received from a distillation is stored, if necessary, at 4° C. to prevent biodegradation. The bulk samples are mixed immediately prior to each use to insure a uniform consistency. 200 gram aliquots of the bulk sample are poured into as many 8 oz tempered glass bottles as there are additives to be evaluated. These filled sample bottles, plus the disposable 50 ml centrifuge tubes and metal centrifuge inserts, are placed in a 90 C forced air oven. After the samples, centrifuge tubes, and inserts reach 90 C, each sample is dosed with the intended concentration of surfactant, then the dosed samples are equally shaken and returned to the 90 C oven for 30 minutes. 45 mls of each dosed sample is poured into the heated, disposable centrifuge tubes. The heated metal centrifuge inserts are removed and placed into the centrifuge. Each filled centrifuge tube is quickly placed into a heated centrifuge insert. The samples are centrifuged for 15 minutes at about 2640 rpm. The tubes are removed from the centrifuge without tilting or mixing the contents. The thickness of the separated corn oil layers is measured using magnification for accuracy. The results are compared to quantify separation efficiencies wherein a larger thickness represents improved separation.

Example

The general procedure is provided for the synthesis of a blend of 85% POE(67) with 67 ethylene oxide groups corn-oil glycerate, 10% POE(14) monooleate with 14 ethylene oxide groups, and 5% water.

A reactor is charged with 19 parts of corn oil, 2 parts of glycerin, and 0.1 part KOH (45%) and heated at 170-180° C. at atmospheric pressure for about 8 hours. The mixture is then cooled to 140-150° C. followed by the addition of 64 parts of ethylene oxide while maintaining the temperature at 140-150° C. The reaction is then cooled. The glycerate product is cooled to 50-60° C., then mixed in 10 parts of POE (14) monooleate and 5 parts of water. The pH is adjusted to 6-8 with lactic acid. The formula is provided in Table 1.

TABLE 1

| Corn Oil | 19.14% |
|---|---|
| Liquid KOH (45%) | 0.09% |
| Glycerine | 2.00% |
| Ethylene Oxide (EO) | 63.77% |
| Ethox MO-14 | 10.00% |
| Water | 5.00% |
| Lactic Acid (88%) | 0.00% |

For the purposes of demonstrating the invention, the degree of corn oil extraction is determined by the yield of clear corn oil after centrifugation defined as the thickness of the corn oil layer. The higher the level of corn oil yield, as determined by the millimeters thickness of the separated corn oil layer, the better the additive product. Ethoxylated modified corn oil itself makes a very good treating compound. The level of this surfactant needed for the stillage in these tests was 400-500 ppm on the weight of whole stillage.

A particularly suitable example is modifed corn oil glycerate with 67 moles of ethylene oxide is preferably used in liquid form to improve penetration and wetting into the stillage and, for the purposes of demonstration, is provided as a mixture with 10% POE(14) monooleate and 5% water as Inv. 1. In Table 2, Inv. 1 was compared with sorbitan monooleate with 20 EO groups, Comp. 1, available commercially from Croda or other suppliers. The pertinent parameters and comparison are provided in Table 2.

TABLE 2

| | Composition | Cloud Point | Centrifuge Time/speed | Corn Oil separation yields (mm at 10 × magnification) |
|---|---|---|---|---|
| Inv. 1 | 85% POE(67) corn-oil glycerate 10% POE(14) monooleate 5% water. | 85° C. | 7 min/7.5 setting | 80 mm |
| Comp. 1 | Sorbitan monooleate w/ 20 EO units | 90° C. | 7 min/7.5 setting | 82 mm |

The results in Table 2 illustrate the effectiveness of the Inventive sample which is comparable to a commercially available material, yet it can be prepared directly from corn oil obtained from the process thereby significantly decreasing the cost of the material while still providing sufficient separation of corn oil.

Samples were prepared utilizing propylene oxide as a fraction of the alkylene oxide. The introduction of propylene oxide reduces the cloud point and the corn oil separation relative to ethylene oxide alone yet the advantages are still provided as realized from the results provided in Table 3.

TABLE 3

| | Composition | Cloud Point | Centrifuge Time/speed | Corn Oil separation yields (mm at 10 × magnification) |
|---|---|---|---|---|
| Inv. 2 | 24.98% corn-oil glycerate 75.03% ethylene oxide 00.00% propylene oxide | 90° C. | 7 min/7.5 setting | 75 mm |
| Inv. 3 | 25.00% corn oil glycerate 67.50% ethylene oxide 07.50% propylene oxide (oxides premixed) | 85° C. | 7 min/7.5 setting | 45 mm |
| Inv. 4 | 25.00% corn-oil glycerate 63.75% ethylene oxide 11.25% propylene oxide (oxides premixed) | 76° C. | 7 min/7.5 setting | 55 mm |

Samples were prepared as set forth in Table 4 wherein the advantages of the present invention are illustrated.

| | Composition | Cloud Point | Centrifuge Time/speed | Corn Oil separation yields (mm at 10 × magnification) |
|---|---|---|---|---|
| Inv. 5 | 85% POE(67) corn-oil glycerate 10% POE(14) monooleate 5% water. | 85° C. | 7 min/7.5 setting | 80 mm |
| Comp. 2 | Castor oil with 50 moles ethylene oxide | 80° C. | 7 min/7.5 setting | 54 mm |
| Comp. 3 | Castor oil with 63 moles ethylene oxide | 88° C. | 7 min/7.5 setting | 34 mm |
| Comp. 4 | 1;1 w/w blend of POE(40) castor oil And POE(63) castor oil | 92° C. | 7 min/7.5 setting | 48 mm |

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A process for separating corn oil from stillage comprising:
   forming stillage from fermentation of corn;
   mixing said stillage with a chemical additive comprising alkoxylated modified corn oil prepared by the transesterification of corn oil with glycerine followed by alkoxylation; and
   separating said corn oil from said stillage.

2. The process for separating corn oil form stillage of claim 1 comprising separating said stillage into wet grain and thin stillage wherein said chemical additive is mixed with said thin stillage.

3. The process for separating corn oil from stillage of claim 1 comprising separating said stillage into wet grain and thin stillage followed by removing water from said thin stillage to form syrup wherein said chemical additive is mixed with said syrup.

4. The process for separating corn oil from stillage of claim 1 wherein said chemical additive comprises at least one alkoxylated modified corn oil which is selected from the group consisting of:

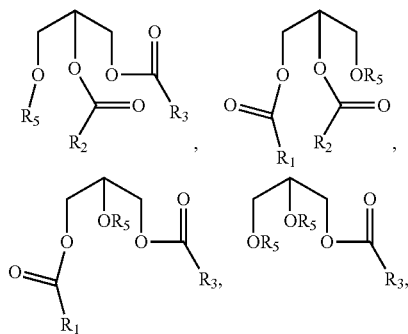

-continued

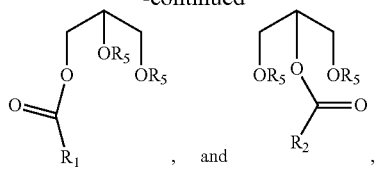

wherein:
R₁, R₂ and R₃ are independently the groups necessary to define corn oil;
wherein each $R_5$ independently represents —(CH$_2$CH(R$^4$)O)$_a$—R$^6$;
$R^4$ is selected from H, —CH$_3$ and —CH$_2$CH$_3$;
$R^6$ is selected from H, alkyl or substituted alkyl of 1 to 10 carbons, and —C(=O)OR$^7$;
$R^7$ is an alkyl or substituted alkyl of 1 to 10 carbons; and
a=2-500.

5. The process for separating corn oil from stillage of claim 4 wherein said chemical additive comprises monoglycerides and diglycerides.

6. The process for separating corn oil from stillage of claim 5 wherein said monoglycerides and diglycerides are in a molar ratio of at least 0.1:1 to no more than 1:0.1.

7. The process for separating corn oil from stillage of claim 6 wherein said monoglycerides and diglycerides are in a molar ratio of at least 0.5:1 to no more than 1:0.5.

8. The process for separating corn oil from stillage of claim 7 wherein said monoglycerides and diglycerides are in a molar ratio of at least 1.1:1 to no more than 1:1.1.

9. The process for separating corn oil from stillage of claim 5 wherein said monoglycerides and diglycerides are in a molar ratio of 1:1.

10. The process for separating corn oil from stillage of claim 4 wherein one of R₁, R₂ or R₃ is a eighteen carbon unsaturated chain.

11. The process for separating corn oil from stillage of claim 4 wherein one of R₁, R₂ or R₃ comprise —C$_{17}$H$_{35}$, —C$_{17}$H$_{33}$, —C$_{17}$H$_{31}$, or C$_{15}$H$_{33}$.

12. The process for separating corn oil from stillage of claim 4 wherein each integer a is independently an integer of 10-60.

13. The process for separating corn oil from stillage of claim 12 wherein each integer a is 20-50.

14. The process for separating corn oil from stillage of claim 1 wherein said mixture of stillage and chemical additive has a cloud point of 60-100° C.

15. The process for separating corn oil from stillage of claim 14 wherein said mixture of stillage and chemical additive has a cloud point of 75-90° C.

16. The process for separating corn oil from stillage of claim 15 wherein said mixture of stillage and chemical additive has a cloud point of 85-90° C.

17. The process for separating corn oil from stillage of claim 1 comprising mixing 10-10,000 ppm by weight of said chemical additive to said stillage.

18. The process for separating corn oil from stillage of claim 17 comprising mixing 200-800 ppm by weight of said chemical additive to said stillage.

19. The process for separating corn oil from stillage of claim 18 comprising mixing 300-600 ppm by weight of said chemical additive to said stillage.

20. A mixture suitable for the extraction of corn oil comprising:
corn stillage; and
a chemical additive comprising alkoxylated modified corn oil prepared by the transesterification of corn oil with glycerine followed by alkoxylation.

21. The mixture suitable for the extraction of corn oil of claim 20 wherein said stillage is selected from thin stillage and syrup.

22. The mixture suitable for the extraction of corn oil of claim 20 wherein said chemical additive comprises at least on alkoxylated modified corn oil is selected from the group consisting of:

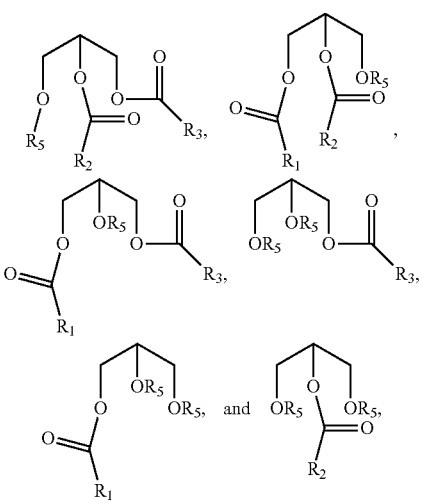

wherein:
R₁, R₂ and R₃ are independently the groups necessary to define corn oil;
wherein each $R_5$ independently represents —(CH$_2$CH(R$^4$)O)$_a$—R$^6$;
$R^4$ is selected from H, —CH$_3$ and —CH$_2$CH$_3$;
$R^6$ is selected from H, alkyl or substituted alkyl of 1 to 10 carbons, and —C(=O)OR$^7$;
$R^7$ is an alkyl or substituted alkyl of 1 to 10 carbons; and
a=2-500.

23. The mixture suitable for the extraction of corn oil of claim 20 wherein said chemical additive further comprises monoglycerides and diglycerides.

24. The mixture suitable for the extraction of corn oil of claim 23 wherein said monoglycerides and diglycerides are in a molar ratio of at least 0.1:1 to no more than 1:0.1.

25. The mixture suitable for the extraction of corn oil of claim 24 wherein said monoglycerides and diglycerides are in a molar ratio of at least 0.5:1 to no more than 1:0.5.

26. The mixture suitable for the extraction of corn oil of claim 25 wherein said monoglycerides and diglycerides are in a molar ratio of at least 1.1:1 to no more than 1:1.1.

27. The mixture suitable for the extraction of corn oil of claim 23 wherein said monoglycerides and diglycerides are in a molar ratio of 1:1.

28. The mixture suitable for the extraction of corn oil of claim 22 wherein each integer a is independently an integer of 10-60.

29. The mixture suitable for the extraction of corn oil of claim 28 wherein each integer a is 10-50.

30. The mixture suitable for the extraction of corn oil of claim 22 wherein one of $R_1$, $R_2$ or $R_3$ is an eighteen carbon unsaturated alkyl chain.

31. The mixture suitable for the extraction of corn oil of claim 22 wherein one of $R_1$, $R_2$ and $R_3$ comprise —$C_{17}H_{35}$, —$C_{17}H_{33}$, —$C_{17}H_{31}$, or $C_{15}H_{33}$.

32. The mixture suitable for the extraction of corn oil of claim 20 wherein said mixture of stillage and chemical additive has a cloud point of 60-100° C.

33. The mixture suitable for the extraction of corn oil of claim 32 wherein said mixture of stillage and chemical additive has a cloud point of 75-90° C.

34. The mixture suitable for the extraction of corn oil of claim 33 wherein said mixture of stillage and chemical additive has a cloud point of 85-90° C.

35. The mixture suitable for the extraction of corn oil of claim 20 comprising 10-10,000 ppm by weight of said chemical additive.

36. The mixture suitable for the extraction of corn oil of claim 35 comprising 200-800 ppm by weight of sad chemical additive.

37. The mixture suitable for the extraction of corn oil of claim 36 comprising 300-600 ppm by weight of said chemical additive.

* * * * *